United States Patent [19]

Gegel et al.

[11] Patent Number: 4,762,679

[45] Date of Patent: * Aug. 9, 1988

[54] BILLET CONDITIONING TECHNIQUE FOR MANUFACTURING POWDER METALLURGY PREFORMS

[75] Inventors: Harold L. Gegel, Kettering, Ohio; Yellapregada V. R. K. Prasad, Bangalore, India; Sokka M. Doraivelu, Dublin, Ohio; Raghavan Srinivasan, Fairborn, Ohio; J. S. Gunasekera, Athens, Ohio; Douglas R. Barker, Centerville, Ohio; James T. Morgan, Jr., Huber Heights, Ohio; James C. Malas, Dayton, Ohio; Kristine A. Lark, Enon, Ohio; Lawrence E. Matson, Xenia, Ohio

[73] Assignee: The United States of America as represented by the Secretary of the Air Force, Washington, D.C.

[*] Notice: The portion of the term of this patent subsequent to Oct. 21, 2003 has been disclaimed.

[21] Appl. No.: 70,276

[22] Filed: Jul. 6, 1987

[51] Int. Cl.$^4$ .............................................. B22F 3/24
[52] U.S. Cl. ...................................... 419/28; 73/863; 73/866; 419/31; 419/38; 419/48; 419/49; 419/53; 419/54; 419/60
[58] Field of Search ..................... 419/4 B, 49, 31, 38, 419/28, 53, 54, 60; 73/863, 866

[56] References Cited

U.S. PATENT DOCUMENTS

| | | | |
|---|---|---|---|
| 3,340,101 | 9/1967 | Fields, Jr. et al. | 148/11.5 |
| 3,469,433 | 9/1969 | Fresch et al. | 72/364 |
| 3,519,503 | 7/1970 | Moore et al. | 148/11.5 |
| 3,544,392 | 12/1970 | Lyle, Jr. et al. | 148/11.5 |
| 3,772,090 | 11/1973 | Allen et al. | 148/11.5 F |
| 3,897,618 | 8/1975 | Church | 419/29 |
| 3,954,458 | 5/1976 | Roberts | 75/200 |
| 3,975,219 | 8/1976 | Allen et al. | 148/11.5 P |
| 4,066,449 | 1/1978 | Havil | 419/48 |
| 4,073,648 | 2/1978 | Volin et al. | 419/48 |
| 4,106,956 | 8/1978 | Bercovici | 148/11.5 A |
| 4,297,136 | 10/1981 | Pickens et al. | 75/206 |
| 4,375,375 | 3/1983 | Giamei et al. | 148/11.5 F |
| 4,464,199 | 8/1984 | Hildeman et al. | 75/249 |
| 4,479,293 | 10/1984 | Miller et al. | 419/29 |
| 4,617,817 | 10/1986 | Gegel et al. | 72/364 |
| 4,710,345 | 12/1987 | Doi et al. | 419/28 |

OTHER PUBLICATIONS

Rishi Raj, "Development of a Processing Map for Use in Warm-Forming and Hot-Forming Processes", in Metallurgical Transactions, vol. 12A, Jun. 1981, pp. 1089–1097.

(List continued on next page.)

Primary Examiner—Stephen J. Lechert, Jr.
Attorney, Agent, or Firm—Bobby D. Scearce; Donald J. Singer

[57] ABSTRACT

A process for manufacturing powder metallurgy (P/M) preforms which are conditioned for optimum intrinsic workability is described which comprises steps of heating a quantity of P/M material in a can to a first preselected temperature under vacuum to degas the material, compacting the canned material at a second preselected temperature under pressure to provide a compact of the material; or cold compacting the powder to about 75% density and degassing it at suitable temperature and then vacuum hot pressing the powder at about 0.75 melting point; generating flow stress data as a function of strain rate and temperature on samples of the compact at predetermined strain within predetermined ranges of temperature and strain rate and determining powder dissipation efficiency of the compact and entropy rate ratio within those ranges of temperature and strain rate; selecting values of strain rate and extrusion temperature at which dynamic recrystallization is the dominant metallurgical mechanism characterizing the compact; and extruding the compact in an extrusion can at the selected extrusion temperature and at an extrusion rate corresponding to the selected strain rate using a streamlined die. An improved processing map for preselecting optimum processing parameters for the material is described.

36 Claims, 10 Drawing Sheets

OTHER PUBLICATIONS

C. Gandhi and M. F. Ashby, "Fracture-Mechanism Maps for Materials Which Cleave: F. C. C., B. C. C. and H. C. P. Metals and Ceramics", in Acta Metallurgica vol. 27, 1979, pp. 1565–1602.

H. H. Heinemann, "Flow Stress of Different Aluminum and Copper Alloys for High Strain-Rates and Tempertures", Dissertation TH Aachen, 1961.

R. Akeret, "Untersuchungen üer das Umformverhalten von Aluminumwerkstoffen bei verschiedenen Temperaturen", Z Metallkde 61 (1970), pp. 3–10.

M. J. Luton and C. M. Sellars, "Dynamic Recrystallization in Nickel and Nickel Iron Alloys during High Temperature Deformation", in Acta Metallurgica vol. 17, Aug. 1969, pp. 1033–1040.

J. M. Jacquerie and L. Habraken, "Contribution to the Study of the Resistance of Cobalt to Plastic Flow at High Temperature", in Cobalt vol. 38, Mar. 1968, pp. 13–19.

J-P. A. Immarigeon and J. J. Jonas, "The Deformation of Armco Iron and Silicon Steel in the Vicinity of the Curie Temperture", in Acta Metallurgica vol. 22, Oct. 1974, pp. 1235–1247.

H. Bühler and H. W. Wagener, "Die Staucheigenschaften vol Zirkonium and Zircaloy-2", Z. Metallkde vol. 58, 1967, pp. 136–144.

M. Doner and H. Conrad, "Deformation Mechanisms in Commercial Ti-50A", Metall. Trans 4A, 1973, pp. 2809–2817.

R. Bromley, "The High Temperature Deformation of Copper and Copper Aluminum Alloys", PhD Thesis, University of Sheffield, 1969.

T. E. O'Connell and D. M. Merczik "Production of Titanium Aluminum Products", FR-13378, AFSC-ASD-WPAFB, 1980.

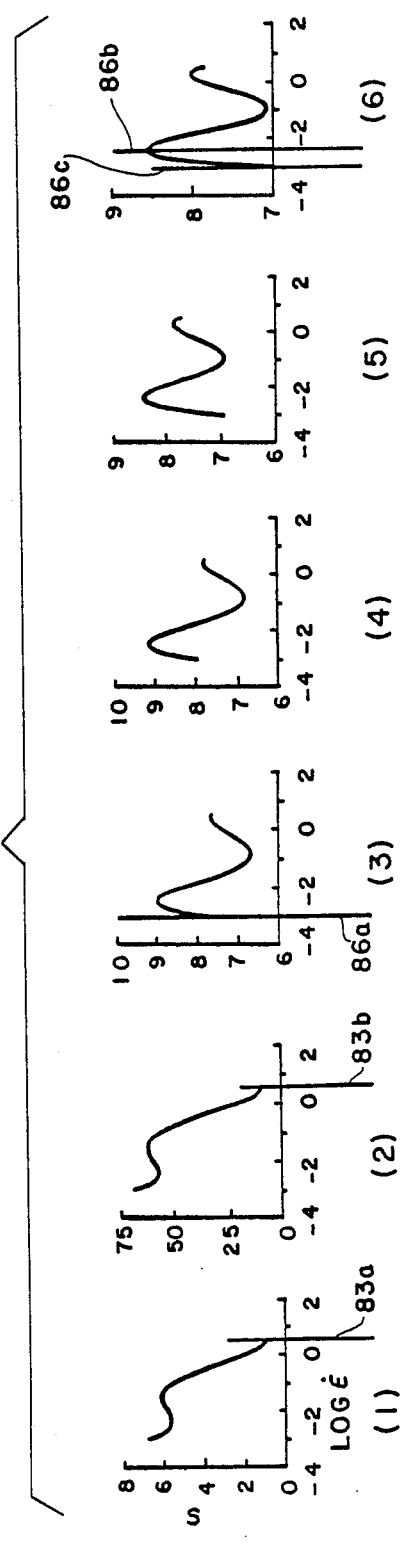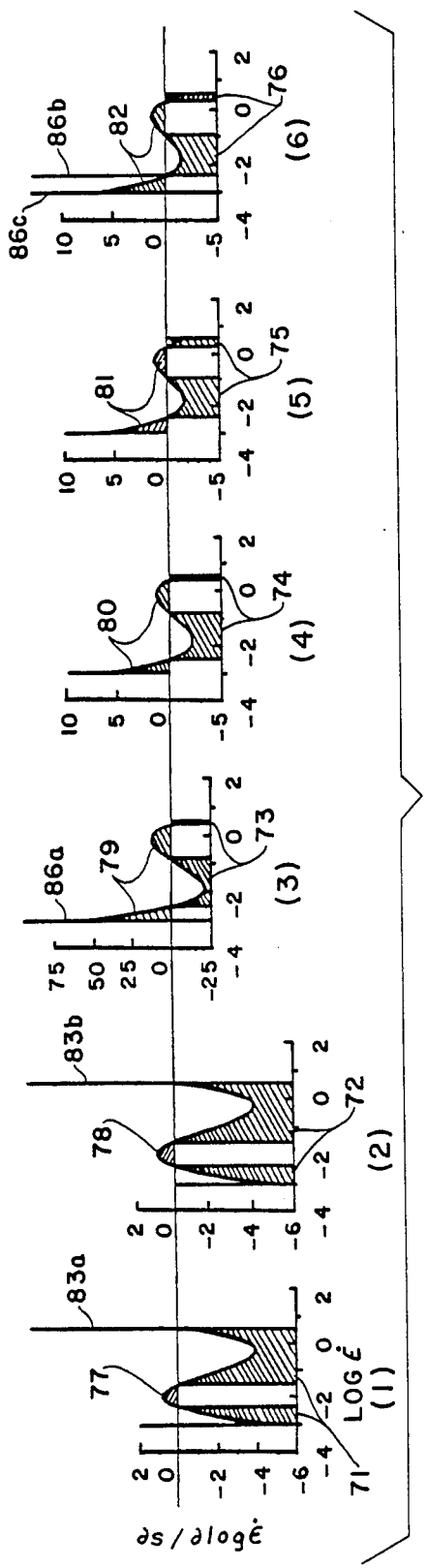

BILLET CONDITIONING TECHNIQUE FOR MANUFACTURING POWDER METALLURGY PREFORMS

RIGHTS OF THE GOVERNMENT

The invention described herein may be manufactured and used by or for the Government of the United States for all governmental purposes without the payment of any royalty.

CROSS REFERENCE TO RELATED APPLICATION

This invention is related to application Ser. No. 698,728 filed Feb. 6, 1985, now U.S. Pat. No. 4,617,817 (Oct. 21, 1986) entitled "Optimizing Hot Workability and Controlling Microstructures in Difficult to Process High Strength and High Temperature Materials".

BACKGROUND OF THE INVENTION

The invention relates generally to processes for hot forming materials, and particularly to a process for manufacturing powder metallurgy (P/M) preforms which are preconditioned and characterized for further conditioning to achieve microstructural refinement by processes such as dynamic recrystallization within the material comprising the preform.

Modern high strength and high temperature materials such as rapid solidification technology (RST) alloys have unique and complex composition, microstructure and mechanical properties, and are characterized by good oxidation resistance, low density and other favorable properties for high temperature applications. However, powder materials and materials produced by advanced ingot metallurgy are in general characterized by poor hot workability. Using the dynamic materials modeling approach of the cross reference, behavior of a material during forging, extrusion, rolling, sheet metal forming, or other hot forming material processes may be predicted and characterized by defining in advance response of the material to demands of the process. Optimum hot workability and precise microstructural control may therefore be achieved in the material. The teachings of the cross reference and background material disclosed therein are incorporated herein by reference.

According to the cross reference optimum processing parameters are selected from energy dissipation maps generated from inelastic constitutive equation data which describe flow behavior of a workpiece material as a function of temperature, strain, and strain rate, and which describe power dissipation efficiencies for the material favoring metallurgical processes that enhance both hot workability and mechanical properties in the material. Temperature and strain rates selected from an energy dissipation map are determinative of the optimum rate at which energy may be applied to hot form the material through desirable metallurgical processes without fracture, to ameliorate effects of pre-existing defects in the material, and to obtain a microstructure consistent with prescribed engineering properties for the product.

The invention defines a process for manufacturing P/M preforms which are conditioned for optimum intrinsic workability through improved interparticle bond strength of a P/M compact and through avoidance of certain defects in the product. A major limitation of existing RST methods for manufacturing alloy powders is the inability to process powders into billets which are free of prior particle boundary and other defects and which have a microstructure providing enhanced workability. The invention overcomes this limitation in a process for producing substantially defect free P/M billets having predetermined microstructure and mechanical properties for subsequent near net shape hot forming without prior trial-and-error determinations of process parameters.

The process of the invention comprises steps of first preconditioning P/M powder by either degassing the powder under vacuum in a can at predetermined temperature and blind compacting the canned powder at a temperature of about 0.75 melting point (°K.) of the powder; or cold compacting the powder to about 75% density, degassing it at suitable temperature and vacuum hot pressing it at about 0.75 melting point. The compact is characterized by developing a processing map to select temperature and strain rate for the preconditioned compact at which dynamic crystallization is achieved in the billet. The compact is extruded at the selected temperature and corresponding strain rate using a streamlined die configured according to process modeling techniques.

It is a principal object of the invention to provide a process for consolidating P/M preforms under optimum working conditions.

It is a further object of the invention to provide a process of preconditioning a P/M preform to optimize hot workability of the material comprising the preform.

It is yet another object of the invention to provide a process for preconditioning P/M preform billets and optimizing hot forming process parameters to achieve microstructure refinement in the billets to produce near net shape products.

These and other objects of the invention will become apparent as a detailed description of representative embodiments proceeds.

SUMMARY OF THE INVENTION

In accordance with the foregoing principles and objects of the invention, a process for manufacturing powder metallurgy (P/M) preforms which are conditioned for optimum intrinsic workability is described, which comprises steps of heating a quantity of P/M material in a can to a first preselected temperature under vacuum to degas the material, compacting the canned material at a second preselected temperature under pressure to provide a compact of the material; or cold compacting the powder to about 75% density and degassing it at suitable temperature and then vacuum hot pressing the powder at about 0.75 melting point; generating flow stress data as a function of strain rate and temperature on samples of the compact at predetermined strain within predetermined ranges of temperature and strain rate and determining power dissipation efficiency of the compact and entropy rate ratio within those ranges of temperature and strain rate; selecting values of strain rate and extrusion temperature at which dynamic recrystallization is the dominant metallurgical mechanism characterizing the compact: and extruding the compact in an extrusion can at the selected extrusion temperature and at an extrusion rate corresponding to the selected strain rate using a streamlined die. An improved processing map for preselecting optimum processing parameters for the material is described.

DESCRIPTION OF THE DRAWINGS

The invention will be clearly understood from the following detailed description of representative embodiments thereof read in conjunction with the accompanying drawings wherein:

FIG. 5b is a map of constant efficiency contours on the strain rate versus temperature plot of FIG. 5a;

FIGS. 7a, 7b present plots of Liapunov function of entropy production rate coefficient versus strain rate at 0.6 strain and various temperatures in Ti-6242$\beta$ microstructure;

FIG. 11b is a map of constant efficiency contours derived from the strain rate versus temperature plot of FIG. 11a;

FIG. 12b is a map of constant efficiency contours derived from the strain rate versus temperature plot of FIG. 12a;

FIG. 13b is a map of constant efficiency contours derived from the strain rate versus temperature plot of FIG. 13a.

DETAILED DESCRIPTION

Figure 1:
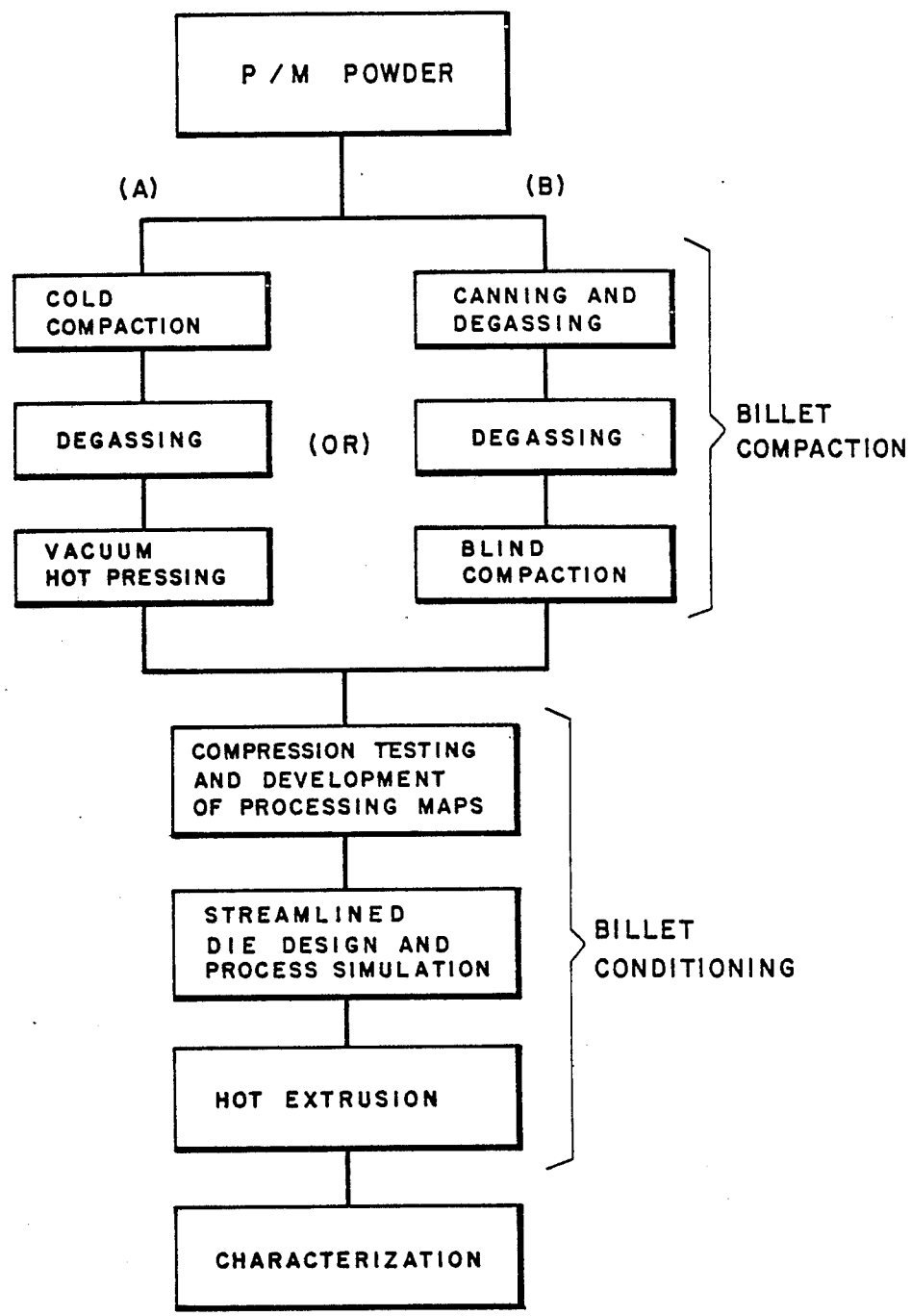
FIG. 1 is a block diagram of various steps of the invention in compaction, conditioning and characterization of P/M preforms.

Referring to FIG. 1 of the drawings, shown therein is a flow diagram in block form of the various steps for manufacture of P/M preforms according to the invention. The invention contemplates two process sequences, billet compaction and billet conditioning. The billet compaction sequence comprises two alternative process sequences as illustrated in FIG. 1. In one compaction sequence (A), P/M powder is first cold compacted to preselected density, degassed at appropriate temperature and then vacuum hot pressed. In alternative sequence (B), P/M powder is degassed under vacuum in a can at preselected temperature and then blind compacted in the can. Following compaction, the billet is tested, processing maps are developed to provide optimum hot working process parameters, and the billet is then extruded and characterized.

BILLET COMPACTION

Cold Compaction: According to sequence (A) of FIG. 1, cold compaction is the first step in consolidation of P/M billets if canning is not desired. Double ended compaction or cold isostatic pressing is preferred prior to hot pressing in order to achieve uniform consolidation across a cross section of the green compact. Tests conducted on 7091 aluminum based P/M alloy showed that substantially complete degassing and sufficient bond strength of the compact to permit easy handling during the hot pressing stage is attained if the powder is cold compacted to a relative density of about 0.75 to 0.77.

Figure 2:
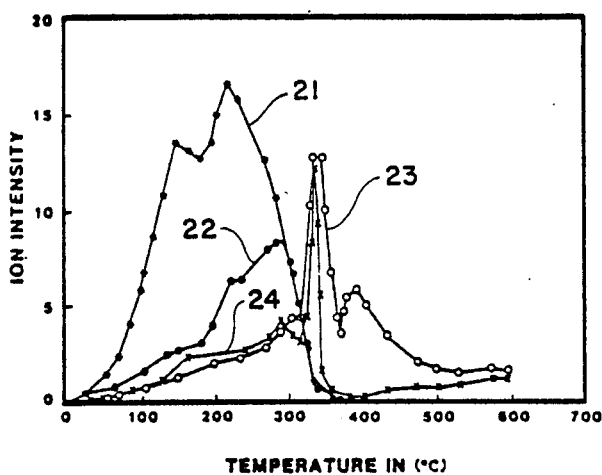
FIG. 2 presents mass spectrometry data on volatile constituents liberated from a green compact of 7091 Al P/M powder.
Figure 3:
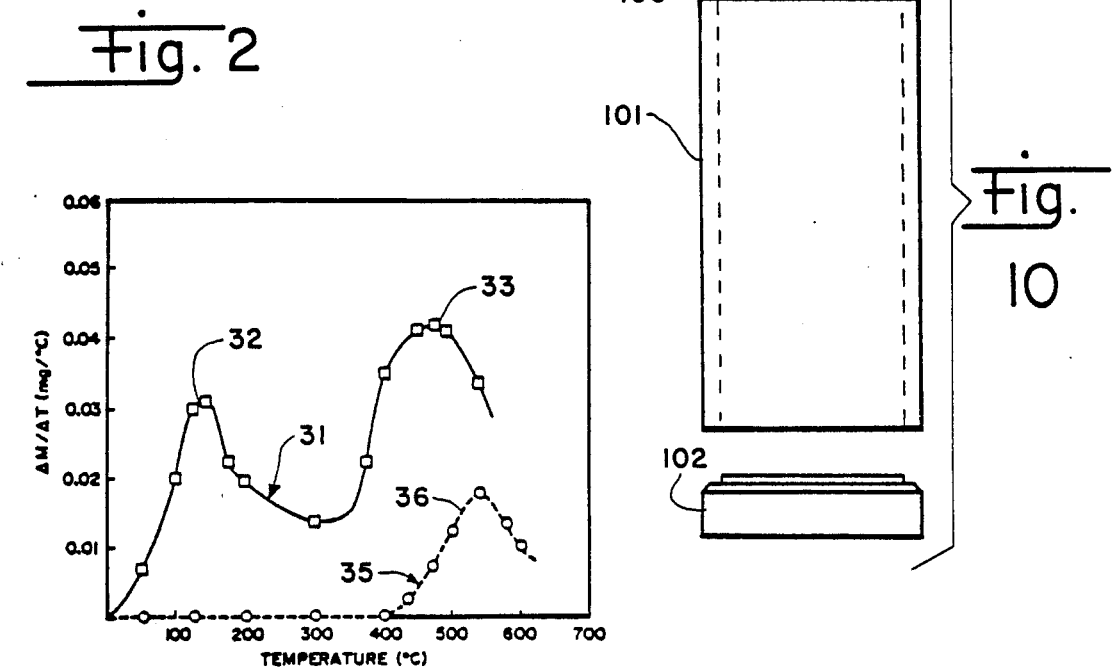
FIG. 3 presents thermogravimetric data on volatile constituents from green, degassed and vacuum hot pressed 7091 Al P/M compacts.

Degassing: Surface layers of powder materials may contain inordinate amounts of impurities, and physical properties of the powder material may therefore differ considerably from the base material. Impurities may include solute elements, oxide layers, hydrated oxide layers, metallic carbides, intermetallic compounds or combination of these. Particle surface composition therefore is affected by specific surface area (size and shape) of the particles. Powder making process selection may be determinative of the nature of the surface layer and physical properties of the base material. The surface layer bears interparticle contact loads directed in normal and tangential directions when the powder is compacted; because the particle surface and contact areas are small and because the stress state of the particle is always at some limiting or critical value, the surface layer in the contact zone will either be the origin of local plastic deformation or fracture of the particle during compaction. Surface layers with hydrated oxide films are of particular importance to aluminum alloys made by air atomization using RST. These layers must be converted to a stable oxide form prior to subsequent processing. Failure to make this conversion may lead to a phenomenon known as blistering which occurs when volatile constituents are liberated during subsequent thermal exposures. This can be avoided for certain aluminum powders by suitable degassing treatment. During conversion, volatile constituents are liberated over various corresponding temperature ranges. FIG. 2 presents mass spectrometer (MSA) data showing liberation of volatile constituents from 7091 aluminum powder green compact; plots 21,22,23,24 are for water, carbon dioxide, hydrogen and carbon monoxide, respectively. FIG. 3 shows thermogravimetric (TGA) data for 7091 aluminum green compacts; plot 31 suggests at peak 32 the reaction,

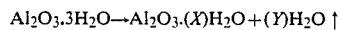

and at peak 33 one or more of the reactions,

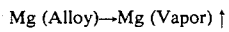

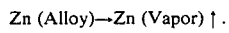

Plot 35 presents TGA data on degassed and vacuum hot pressed compacts and shows little liberation of volatile matter to 400° C. However peak 36 at about 500° C. shows Mg and Zn to be volatilized and liberated. Thereafter, a proper degassing temperature should be selected to avoid loss of these elements for this particular alloy. Nickel base alloys, however, should not be allowed to form a stable oxide on particular surfaces because this acts as a site for heterogeneous nucleation of a $\nu'$ surface for these alloy systems. Inert powder making and handling systems should be used for this class of alloy system.

Vacuum Hot Pressing/Hot Blind Compaction: The P/M billet is consolidated to maximum density and bond strength in a final step of the billet compaction sequence by vacuum hot pressing (VHP) the cold compacted billet according to sequence (A) of FIG. 1 or by hot blind compacting (HBC) the heated degassed powder according to sequence (B). HBC is preferred for billet compaction if canning is desired. Consolidation of powder particles substantially beyond 95% of theoretical density in hydrostatic or repressing (close-die forging) by application of pressure alone theoretically is not attainable; pressure required for densification approaching 100% theoretical density is beyond the capacity of commercially available presses. The VHP or HBC steps of sequences (A) or (B) are therefore preferably preformed at a temperature and strain rate at which diffusion is accelerated to permit substantially full densification, specifically at a temperature of about 0.75 melting point (°K.) of the powder and the slowest practicable strain rate. Both temperature and strain rate for hot working the billet in the billet conditioning sequence are accurately defined in processing maps obtained for the consolidated billet as a later step in the process of the invention.

BILLET CONDITIONING

In the billet conditioning sequence of the invention, the pressed P/M billet is prepared for subsequent use in producing near net shape components. The primary objective of the billet conditioning sequence is to remove prior particle boundaries (PPB) in the consolidated billet to substantially fully recrystallize the entire microstructure. To accomplish this, dynamic material modeling taught in the cross reference is used to characterize the billet and to select optimum process parameters. Process simulations are then conducted and streamlined dies are selected to provide conditioned billets having selected uniform microstructure over a cross section of the billet. The billets so produced have optimum workability to facilitate further forming.

Figure 4:
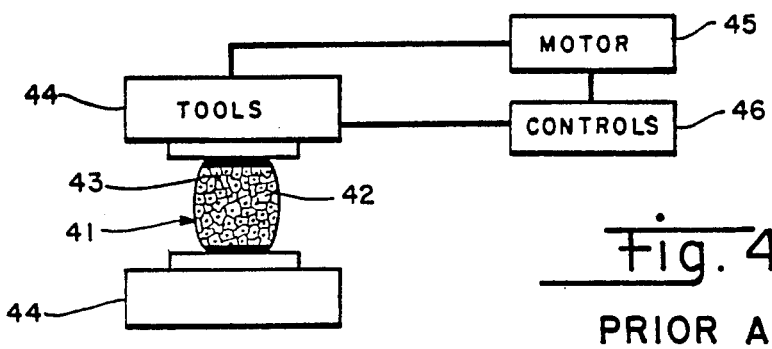
FIG. 4 is a schematic of a generalized metal processing system for hot forming an article according to the cross reference.

Materials Modeling: Referring now to FIG. 4, shown therein is a schematic of a generalized processing system for hot forming an article according to the teachings of the cross reference. In the cross reference, metalworking is viewed as a system in which certain elements are sources and stores of energy while the workpiece is the basic device for dissipating energy. Workpiece 41 may therefore comprise an article of manufacture to be hot formed from material 42 characterized by hot workability under stress, such as a metal or alloy, having microstructure 43. Material 42 is acted upon in the hot forming process by an appropriate power application system including tools 44 powered by motor 45 and controlled by controller 46.

In the cross reference, the constitutive behavior of material 42 is expressed as an analytical relationship of variation of flow stress with temperature and strain rate, which defines how energy applied to workpiece 41 during hot forming is dissipated as viscoplastic heat and by dynamic irreversible metallurgical processes within material 42. Accordingly, instantaneous power applied to workpiece 41 may be described by:

$$\bar{\sigma}\dot{\bar{\epsilon}} = \sigma_1\dot{\epsilon}_1 + \sigma_2\dot{\epsilon}_2 + \sigma_3\dot{\epsilon}_3 \tag{1}$$

where $\bar{\sigma}$ is effective stress, $\dot{\bar{\epsilon}}$ is effective strain rate, and the three terms on the right are the respective products of principal stresses and strain rates within material 42. Effective stress and effective strain rate are hereinafter referred to in short hand fashion simply as $\sigma$ and $\epsilon$, respectively.

Workpiece 41 dissipates applied instantaneous power through a metallurgical process which is commensurate with the applied power level. For example, fracture processes dissipate energy most efficiently when energy is applied at high rates. Metallurgical processes such as superplastic flow dissipate energy with correspondingly high efficiency, but energy must be applied by tools 44 at lower, more controlled rates to promote desired metallurgical process(es). At given strain rate and stress, instantaneous power P absorbed by workpiece 41 in plastic flow is:

$$\sigma\dot{\epsilon} = \int_0^{\dot{\epsilon}} \sigma d\dot{\epsilon} + \int_0^{\sigma} \dot{\epsilon} d\sigma \tag{2}$$

or, $$P + G + J \tag{3}$$

where G, the dissipator content, is the first integral of Eq (2), and J, the dissipator power co-content, is the second integral. G represents the power dissipated by plastic work most of which is converted into viscoplastic heat, the remainder being stored as lattice defects. The dissipator power co-content J is related to the metallurgical mechanisms which occur dynamically to dissipate power. From Eqs (2) and (3), at given strain rate and temperature, $$\left.\frac{\partial J}{\partial G}\right|_{T,\dot{\epsilon}} = \left.\frac{\partial \log \sigma}{\partial \log \dot{\epsilon}}\right|_{T,\dot{\epsilon}} \tag{4}$$

which defines the strain rate sensitivity m of the material:

$$m = \left.\frac{\partial \log \sigma}{\partial \log \dot{\epsilon}}\right|_{T,\epsilon} \approx \left.\frac{\Delta \log \sigma}{\Delta \log \dot{\epsilon}}\right|_{T,\epsilon} \tag{5}$$

The relationship between strain rate and stress at any temperature then is:

$$\dot{\epsilon} = A\sigma^{1/m} \tag{6}$$

where A is a constant. In the hot working range for pure metals, m is temperature and strain rate independent, but in complex alloy systems, m may vary substantially with temperature and strain rate.

At given deformation temperature, strain rate and strain, J is evaluated by integrating Eq (6) between 0 and $\sigma$, viz:

$$J = \int_0^\sigma \dot{\epsilon} d\sigma = \frac{A\sigma^{(1+m)/m}}{(1+m)/m} \tag{7}$$

Combining Eqs (6) and (7) shows J to be related to m as:

$$J = \dot{\sigma}\epsilon m/(m+1) \tag{8}$$

In the integration, strain rate dependence of m represents the flow trajectory taken by the system to reach effective stress $\sigma$ which, according to the variational principle, is a path providing maximum dissipation of J. The value of J at given temperature and strain rate is estimated from the flow stress and m. J is maximum when m=1 and the workpiece acts as a linear dissipator. Thus, $$J_{max} = \dot{\sigma}\epsilon/2 \tag{9}$$

and half the input power is dissipated through dynamic metallurgical processes and half as viscous heat. Behavior of superplastic materials approaches this extreme. The other extreme occurs for strain rate insensitive materials and those which do not flow, in which cases J is zero. Power dissipation efficiency $\eta$ of a material is defined as the ratio $J/J_{max}$:

$$\eta = \frac{J}{J_{max}} = \frac{2m}{m+1} \tag{10}$$

$\eta$ is a measure of the ability of the material to dissipate power through metallurgical processes and is a controlling parameter in defining contours of energy dissipation maps according to the cross reference.

One can formulate a Liapunov function in terms of $\eta$ since the system reaches the maximum value of $\eta$ at the lowest energy state during stable conditions. The Liapunov function is a system quantity associated with Liapunov stability criteria and is an arbitrary term relating changes in total energy of a given system. The Liapunov criteria for stability requires the system to lower the total energy of the system continuously. Therefore, the Liapunov function V is formulated as shown below.

$$V_1 = \eta(\log \dot{\epsilon}) \tag{11}$$

Since $\eta$ forms the condition for stability, $\partial\eta/\partial \log \epsilon$ will be less than zero in the stable region. This condition ensures that the system tends without fracture toward a steady state condition at minimum energy state and maximum $\eta$.

Instantaneous power applied can also be represented in terms of rate of applied entropy as follows:

$$P = \dot{\sigma}\epsilon = \dot{S}_{app}T \tag{12}$$

The slope, $$\left.\frac{\partial P}{\partial T}\right|_{\dot{S}} = \dot{S}_{sys}$$

establishes the rate of entropy produced by the system ($\dot{S}_{sys}$). Furthermore, $$\left.\frac{\partial P}{\partial T}\right|_{\dot{S}} = \frac{\partial P}{\partial T} = -\frac{P\partial(\log P)}{T^2\partial(1/T)} = \frac{\partial P}{T}\left|-\frac{\partial(\log P)}{T\partial(1/T)}\right| \tag{13}$$

where $$\left.\frac{\partial \log P}{T\partial(1/T)}\right|_{\dot{\epsilon}} = \left.\frac{\partial \log \sigma}{T\partial(1/T)}\right|_{\dot{\epsilon}};$$

If a new coefficient s is defined such that, $$s = -\left.\frac{\partial(\log \sigma)}{T\partial(1/T)}\right|_{\dot{\epsilon}} \tag{14}$$

the rate of entropy production by the system is, $$\dot{S}_{sys} = \frac{P}{T} s \tag{15}$$

and P/T can be considered as the rate of applied entropy $\dot{S}_{app}$.

According to the Second Law of Thermodynamics, s is greater than one for stable material flow, which implies that a workpiece should store entropy at least as fast as the entropy production rate of heat working for stable flow. Therefore, $\partial s/\partial \log \dot{\epsilon}$ should be less than zero for stable flow if one treats s as a Liapunov function, i.e., $$V_2 = s(\log \dot{\epsilon}) \tag{16}$$

The two conditions that both $\partial\eta/\partial \log \epsilon$ and $\partial s/\partial \log \epsilon$ be less than zero are used below in development of processing maps.

Processing Maps: For evaluation of $\eta$ and s, flow stress values at various temperatures and strain rates are required at the desired effective strain. The values are generally obtained from flow curves generated using standard compression tests. Compression tests are preferred over other testing methods, such as tensile or torsion tests, because most metalforming operations, especially forging, involve predominantly compressive states of stress. Other advantages of compression testing including ease in preparing test specimens and capability of obtaining large strain and strain rate values. Since the same flow stress values are used to develop constitutive equations for finite element analysis, procedures used for developing processing maps can be easily incorporated into a materials modeling package.

Flow stress and strain rate values are converted to the respective log values and the constitutive relation is obtained by fitting data points to piecewise quadratic functions. Quadratic equations are selected to satisfy the convexity condition. At the intersection of the two equations, log $\epsilon$ and the slopes are matched to obtain a smooth transition. In the region where two equations overlap, log $\sigma$ values are generated by taking the average of the values obtained by two equations. Thus a large number of log $\sigma$ values are generated at close intervals of strain rate values. The log $\sigma$ values are used to represent flow stress as a function of strain rate and temperature, and also used as a subroutine in the finite element analysis. Linear interpolation is used for values between the generated values. A similar procedure is used to generate intermediate points between the experimental data along the temperature axis.

Figure 5A:
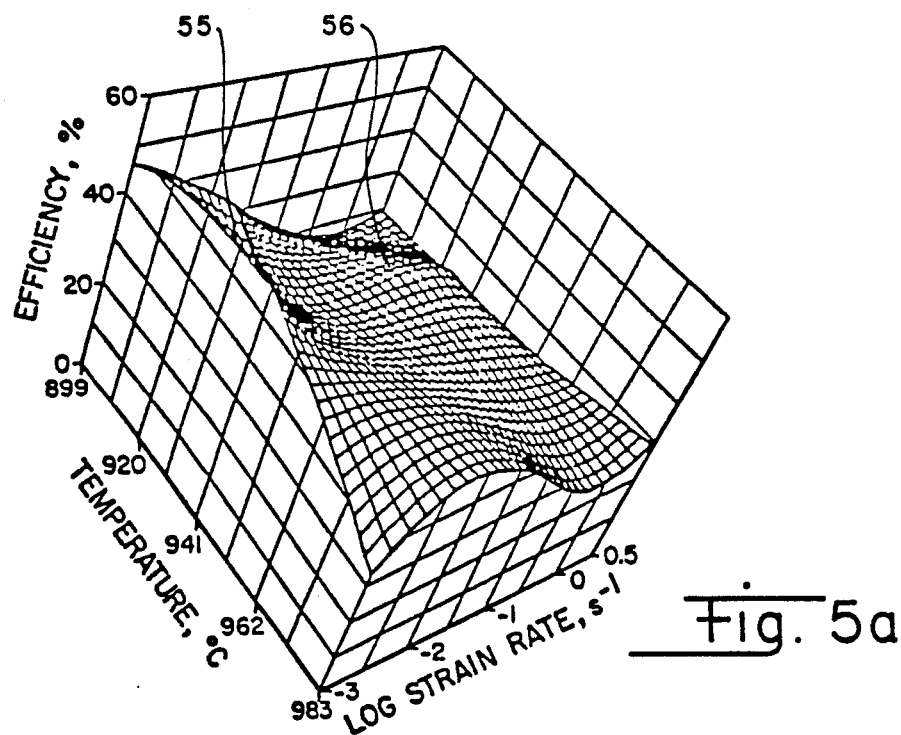
FIG. 5a is a three dimensional plot of dissipation efficiency, temperature and strain rate for Ti-6242$\beta$-preform at 0.6 strain.
Figure 5B:
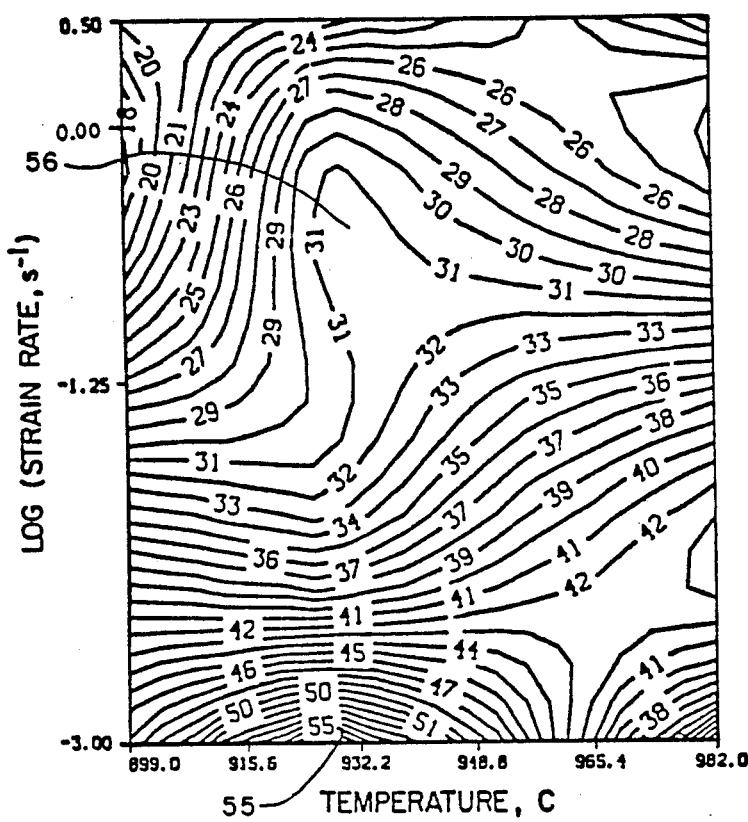

Using stress and strain rate values generated as just described, values of strain rate sensitivity m are calculated using two points at close intervals of log $\sigma$ according to Eq (5):

$$m = \frac{\partial \log \sigma}{\partial \log \dot{\epsilon}}\bigg|_{T,\epsilon} \approx \frac{\Delta \log \sigma}{\Delta \log \dot{\epsilon}}\bigg|_{T,\epsilon} = \frac{\log \sigma_1 - \log \sigma_2}{\log \dot{\epsilon}_1 - \log \dot{\epsilon}_2}\bigg|_T \quad (16)$$

and the dissipation efficiency parameter $\eta$ is determined using Eq (10). Values of $\eta$ as a function of T and log $\dot{\epsilon}$ are formatted into a file which is compatible with a graphics package shown as MOVIE.BYU. A three dimensional plot of dissipation efficiency, temperature and strain rate and the corresponding $\eta$ contour plot are generated as shown in FIGS. 5a, 5b for Ti-6242$\beta$. The significance of peaks 55,56 is defined in the cross reference in the context of the process defined and claimed therein.

Figure 6A:
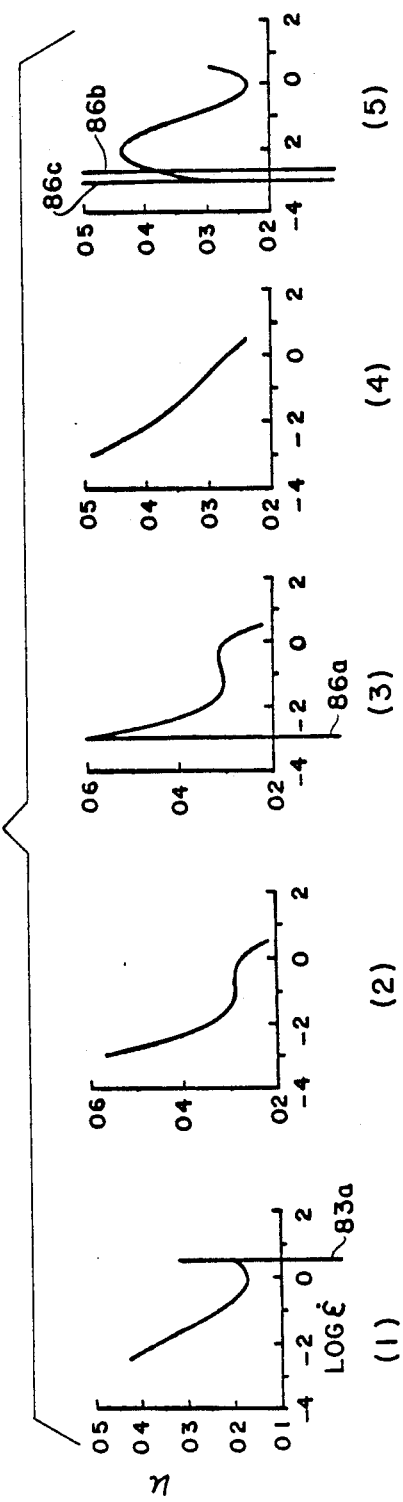
FIGS. 6a, 6b present plots of Liapunov function of dissipation efficiency versus strain rate at 0.6 strain and various temperatures in Ti-6242$\beta$ microstructure.
Figure 6B:
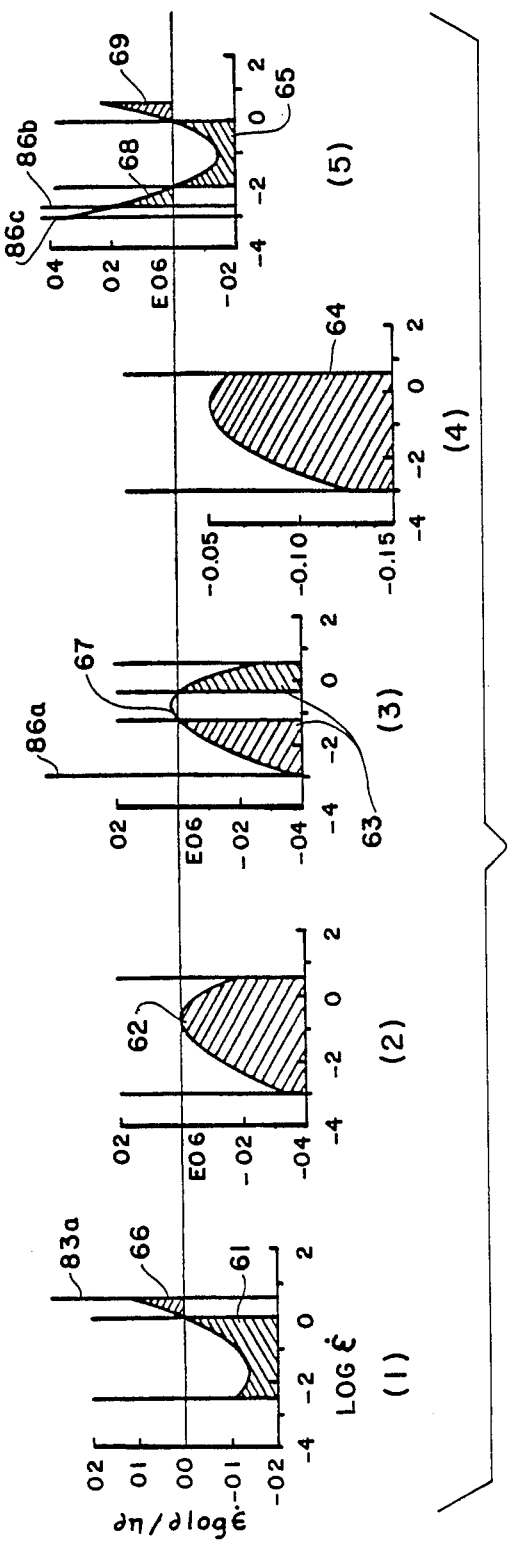

Making use of efficiency values calculated at various strain rates, a polynomial equation yielding the optimum correlation coefficient is obtained as shown in FIG. 6a(1)-(5) for Ti-6242$\beta$. This equation is differentiated to yield values of $\partial \eta/\partial \log \dot{\epsilon}$ as a function of log $\dot{\epsilon}$ at various T, as shown in FIG. 6b(1)-(5). In FIG. 6b(1)-(5), the shaded regions 61-65 at negative values of $\partial \eta/\partial \log \dot{\epsilon}$ represent stable regions, while shaded regions 66-69 at positive values represent unstable regions. In FIGS. 6a, 6b, the drawings labeled (1)-(5) represent, respectively, temperatures of 899°, 920°, 930°, 950° and 982° C. The values of $\partial \eta/\partial \log \dot{\epsilon}$ are superimposed on the corresponding efficiency contour map to define stable and unstable regions depending on whether $\partial \eta/\partial \log \dot{\epsilon}$ is, respectively, negative and positive. From log $\sigma$ values generated above at very close intervals of log $\dot{\epsilon}$ and 1/T, corresponding values of s are calculated between two test temperatures using Eq (14), as follows:

$$s = -\frac{\partial \log \sigma}{T \partial (1/T)}\bigg|_{\dot{\epsilon}} = \frac{\log \sigma_1 - \log \sigma_2}{\frac{(T_1 + T_2)}{2} \cdot \frac{(T_2 - T_1)}{T_1 T_2}} \quad (17)$$

The s values are fitted to a polynomial equation as a function of log $\dot{\epsilon}$ to yield the optimum correlation coefficient. The equation is represented in two dimensions in FIG. 7a(1)-(6). This equation is differentiated and $\partial s/\partial \log \dot{\epsilon}$ values are plotted against log $\dot{\epsilon}$ as shown in FIG. 7b(1)-(6). In FIGS. 7a, 7b, the drawings labeled (1)-(6) represent respective temperatures of 899°, 920°, 930°, 950°, 961° and 982° C. Shaded regions 71-76 of FIGS. 7b(1)-(6) at negative values of $\partial s/\partial \log \dot{\epsilon}$ represent stable regions while regions 77-82 at positive values represent unstable regions. The values derived from the analysis of FIG. 7b are superimposed on the efficiency contour map along with the results of $\partial \eta/\partial \log \dot{\epsilon}$ to generate FIG. 8 wherein areas labeled $\Gamma$ are regions where both $\partial s/\partial \log \dot{\epsilon}$ and $\partial \eta/\partial \log \dot{\epsilon}$ are negative. $\Gamma$ represents the stable intrinsic workability region of the workpiece material and resides between the upper and lower limits of the plastic strain rate and temperature ranges whose boundaries 83,84 for $\Gamma$-1 and 85,86 for $\Gamma$-2, are the loci of all bifurcations where favorable processes co-exist with unfavorable processes which produce defects, fracture or plastic instabilities. The boundaries 83-86 are defined where both $\partial s/\partial \log \dot{\epsilon}$ and $\partial \eta/\partial \log \dot{\epsilon}$ are zero. Along the boundaries, the system is considered marginally stable. As mentioned above $\partial s/\partial \log \dot{\epsilon}$ and/or $\partial \eta/\partial \log \dot{\epsilon}$ are positive in unstable regions.

Figure 8:
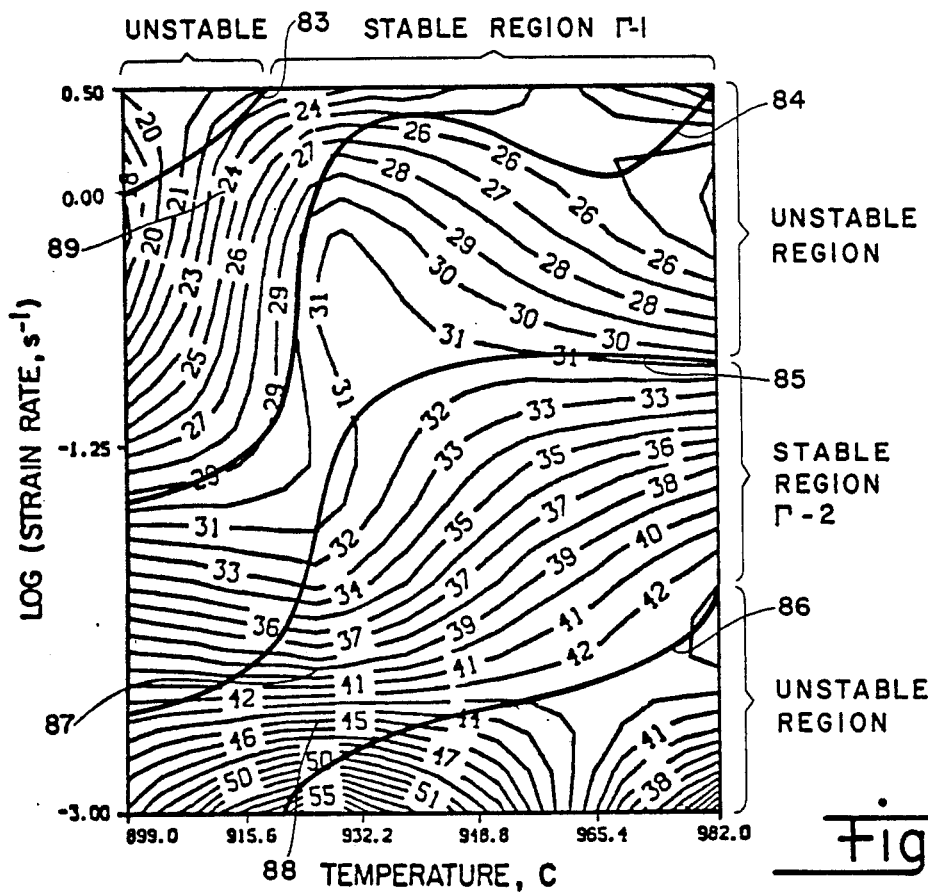
FIG. 8 is a map of constant efficiency contours and stable and unstable regions on the strain rate versus temperature plot for Ti-6242$\beta$ preform.

It is noted that a processing map developed according to the invention as just described may comprise more than one $\Gamma$ region, such as the two illustrated in FIG. 8 for Ti-6242$\beta$. The region labeled $\Gamma$-1 (high strain rate) may be desired for hammer forging Ti-6242 material to produce components. However, to press parts it is preferable to select processing conditions in the low strain rate $\Gamma$-2 region with high efficiency values.

In determining optimum processing conditions from a processing map of the invention, such as shown in FIG. 8, to obtain maximum intrinsic workability of the workpiece material, efficiency values are considered first, although metallurgical mechanisms cannot be characterized based upon efficiency alone. In a $\Gamma$ region where high efficiency is observed, high workability is obtainable since the rate of dissipation by a favorable stable mechanism is high, but this conclusion requires thorough experimental and metallurgical studies outside the scope of these teachings. However, it is instructive in reaching a full understanding of the invention to note a few microstructures in the Ti-6242 processing map of FIG. 8 where peaks in the efficiency surface are observed. Peaks outside the stable regions clearly show microstructural defects, and peaks inside stable $\Gamma$ regions show acceptable stable microstructure.

Consider the microstructure observed in FIG. 8 at 87 (926° C. and $10^{-2.25}\mathrm{s}^{-1}$, which corresponds to the $\alpha$ phase with wedge morphology. Although observed in stable region $\Gamma$-2, this microstructure is not practically acceptable because $\alpha$-phase formation at the grain boundary triple junction has the potential for becoming an initiation site for low cycle fatigue cracking. A strain rate of $3\times 10^{-3}\mathrm{s}^{-1}$ at 926° C. (88 of FIG. 8) may be optimum for disk forging since the selected strain rate allows about 25°-30° C. temperature variation around 926° C. and ram velocity is more easily controlled than working temperature for maintaining constant strain rate in the region of interest. Similarly, a temperature of about 899°-920° C. and a strain rate of about $1.0\mathrm{s}^{-1}$ (89 of FIG. 8) are recommended for hammer forging. Further, correspondence is noted between the boundaries 83-86 of stable and unstable regions of FIG. 8 and the limits of stable and unstable regions of the Liapunov functions displayed in FIGS. 6a, 6b, 7a, 7b. Boundary 83a,83b of FIGS. 6a, 6b, 7a, 7b correspond to the low temperature, high strain rate unstable region of FIG. 8 characterized by onset of grain boundary cracking in the microstructure. Similarly, 86a corresponds to the low strain rate boundary 86 of $\Gamma$-2 of FIG. 8 at about 930° C. characterized by onset of kinking and spheroidization in the microstructure, 86b to onset of cavitation in the microstructure, and 86c to a region of transformed $\alpha$ formation.

FIG. 8 therefore comprises a processing map for Ti-6242$\beta$ according to the invention. One skilled in the art will see that maps for other metals and alloys may be developed in fashion corresponding to the foregoing analysis for Ti-6242$\beta$.

Figure 9A:
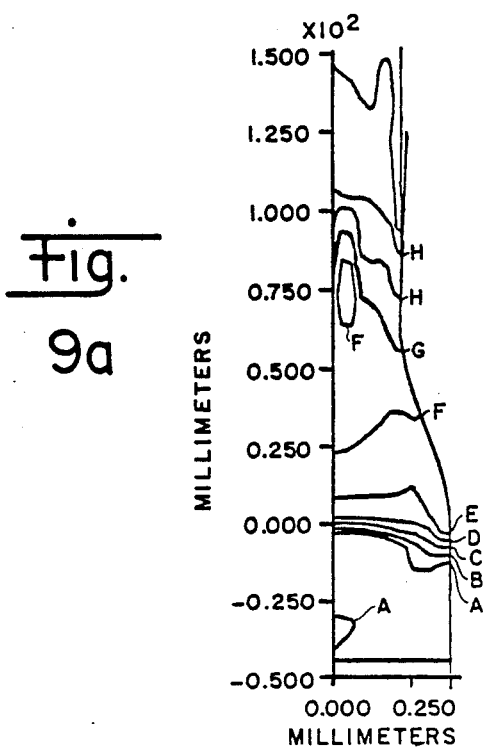
FIGS. 9a and 9b are contours of the ratio of mean stress to effective stress in the streamlined die extrusion of Al—Fe—Mo powder compact in copper and Al-6061 cans.
Figure 9B:
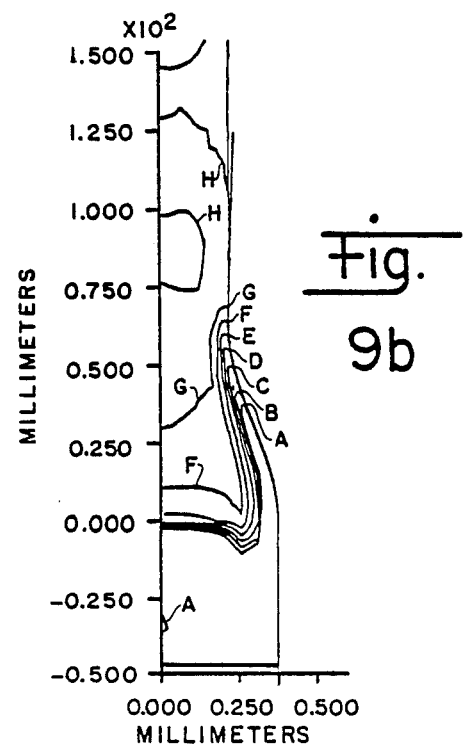

Can Design and Extrusion: Extrusion is a preferred process for billet conditioning to obtain full density uniform microstructure and complete microstructure refinement by recrystallization because in extrusion, control is readily maintained of the ratio of mean hydrostatic stress $\sigma_m$ to effective stress $\sigma$ which plays an important role in obtaining densification with achievable loads of commercially available presses. It is important to note that during an extrusion of canned powder, the core of the composite should not be subjected to axial tensile stresses, especially along the axis, because such stresses lead to central bursting. When axial stress is zero, the stress ratio $\sigma_m/\sigma$ is $-\frac{2}{3}$ along the axis during axisymmetrical process. When axial stress is compressive, the stress ratio is less than $-\frac{2}{3}$ and when axial stress is tensile, the stress ratio is greater than $-\frac{2}{3}$ along the axis. FIGS. 9a and 9b show contours of stress ratio for extrusion of Al—Fe—Mo powder compact in cans of copper and Al-6061, respectively. These can materials were selected for demonstrating the invention because one (copper) is harder than the core material and the other (Al-6061) is softer. Contour lines of stress ratio shown in FIG. 9a correspond in magnitude to identically labeled lines in FIG. 9b in a range of about 0.7 (I) to about 4.9 (A).

FIG. 9b shows that when the can is softer than the core, axial tensile stresses extend well into the deformation zone, which suggests that during powder consolidation, the can material should be ductile yet have higher flow stress than the powder compact. This analysis should be used for can design while designing a streamlined die for extrusion. The length of the die is also optimized based on $\sigma_m/\sigma = -\frac{2}{3}$ to obtain uniform flow and to eliminate central bursting.

Figure 10:
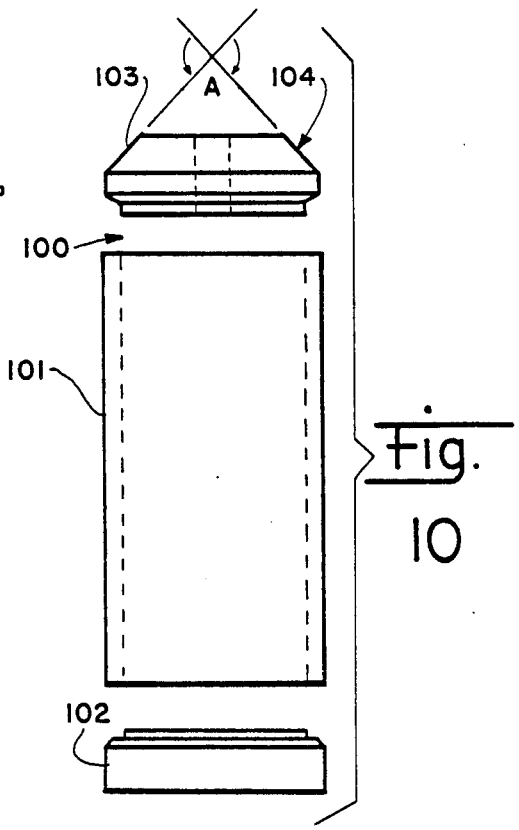
FIG. 10 is a drawing of a representative extrusion can for preconditioning P/M billets according to the invention.

FIG. 10 shows a drawing of representative extrusion can for processing P/M material according to the invention. In extrusion of materials in demonstration of the invention, can 100 comprised a tube 101 of easily extrudable material selected based on the above analysis. A material for extrusion can 100 preferably acts as a lubricant in the extrusion step to prevent galling between can and die, and is itself characterized by a processing map in which dynamic recrystallization is the dominant mechanism at the selected extrusion temperature and strain rate. Tube 101 was about 5.5 inches long by 2.875 inches diameter, with wall thickness of about $\frac{1}{8}$ inch. Endcap 102 was about 0.75 inch thick and was machined for slip fit into a first end of tube 101. Endcap 103 had an overall thickness of about 1.0 inch and was machined on one face to provide a slip fit into a second end of tube 101; endcap 103 further had a bevel 104 machined on the outer face and defining an apex angle A to facilitate the extrusion process. Angle A was about 90° for extrusions in demonstration of the invention. Near isothermal conditions during extrusion may be maintained using a wall thickness of tube 101 so that die chilling is limited to the can 100 material.

REPRESENTATIVE SYSTEMS

Three representative systems were processed in demonstration of the invention. 7091 aluminum P/M alloy, Rene-95 nickel based P/M alloy, and 7740 glass—20 v/o SiC whisker composite preforms were successfully conditioned and extruded as described below. Streamlined extrusion dies are preferred for producing P/M forging preform material, because greater yield and a more uniform product from the center of the billet outwardly and from front to back of the extrusion results. P/M billets can also be consolidated using dies that have other configurations, such as conical and flat shear dies, so long as optimum processing parameters according to the cross reference are used to extrude the material. In these cases, the yield of the extrusion process will always be less than the yield for streamlined dies.

Figure 11A:
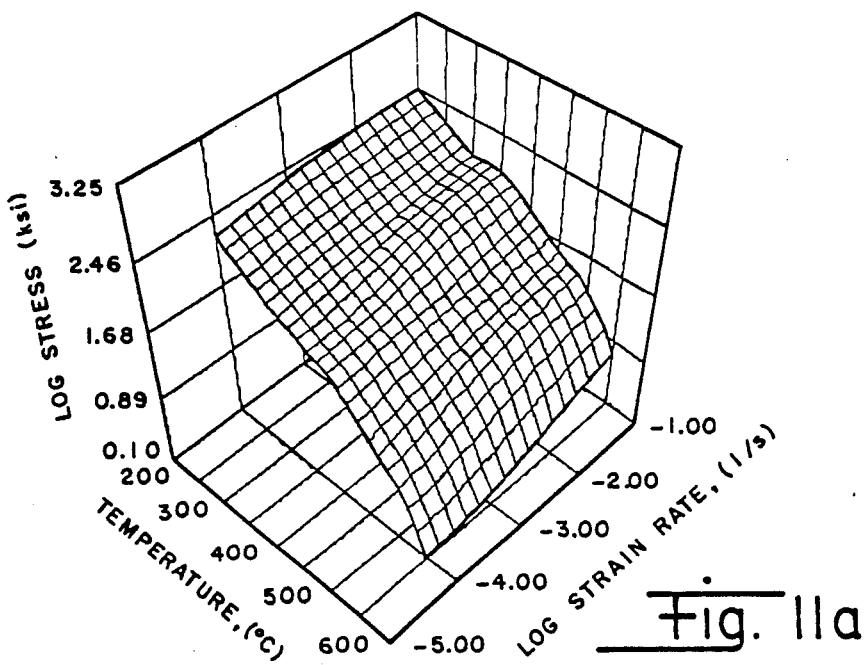
FIG. 11a is a three dimensional plot of stress, temperature and strain rate for 7091 Al based P/M alloy.
Figure 11B:
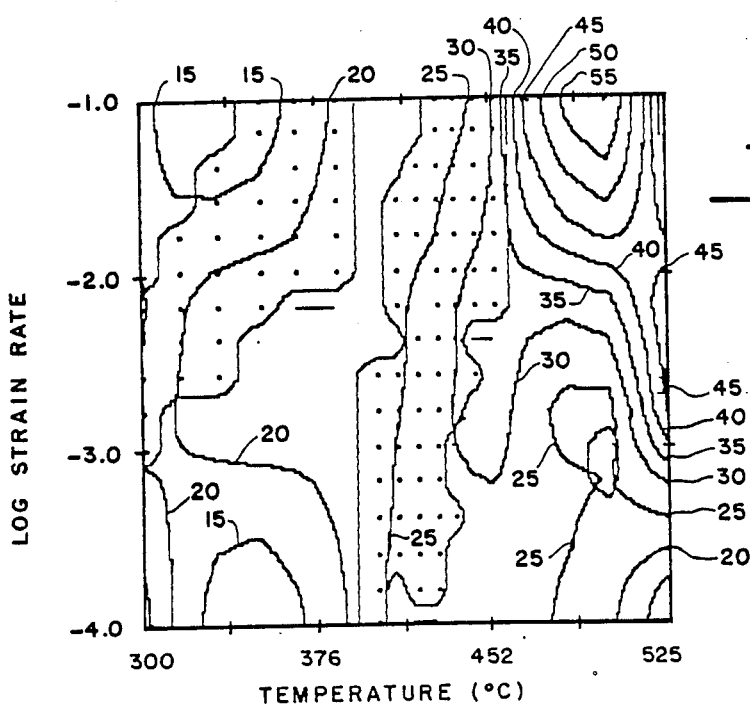
Figure 11C:
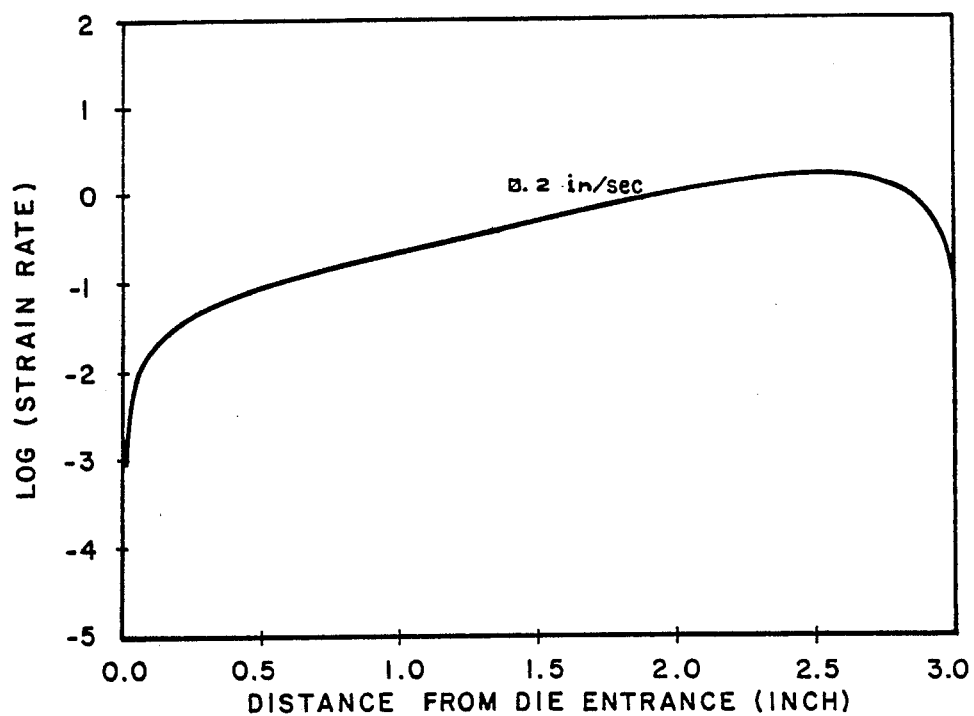
FIG. 11c is a plot of strain rate versus distance along the die length from die entrance for extrusion of material of FIGS. 11a, 11b.

7091 Aluminum P/M Alloy: Cans for compaction and extrusion of 7091 Al preforms comprised 6061 Al configured as shown in FIG. 10. The cans were filled with powder and heated to 750° F. and degassed completely to remove hydrated oxide on the powder particles and were then sealed. C300/Poly was used as a lubricant. The cans were heated to 800° F. for two hours and blind compacted using 184 ksi and 680 tons of load maintained for about 60 sec. The compacted can was removed and air cooled. The compacted can was cleaned and the same lubricant was applied. The billet (2.9 inches in diameter) was heated to 750° F. for two hours and extruded through a 3.00 inch long streamlined die keeping the container and die temperature at about 500° C. A 10.24:1 extrusion ratio was used to obtain a final length of 7 inches of extruded product 0.91 inch in diameter. FIG. 11a shows a three dimensional plot of stress, temperature and strain rate, and FIG. 11b shows a map of constant efficiency contours derived from the constitutive data shown in FIG. 11a, for the 7091 Al alloy material. The temperature and strain rate conditions used for successful extrusions correspond to the stable regions shown as the shaded portions of FIG. 11b. The strain rate variation along the die length is shown in FIG. 11c. The effect of this variation on the workability of the material is explained in the following representative system study.

Rene-95 Nickel Based P/M Alloy: Cans for compaction and extrusion of Rene-95 preforms comprised stainless steel of the FIG. 10 configuration. The cans were filled with −150 mesh Rene-95 powder, heated to 750° C., evacuated and sealed. The cans were prepared for blind compaction and Polygraph was used as lubricant. The lubricated cans of powder were heated to 2000° F. for two hours and blind compacted in an extrusion press under 680 tons of load (184 ksi) maintained for about 60 sec. The compacted can was removed and air cooled.

Figure 12A:
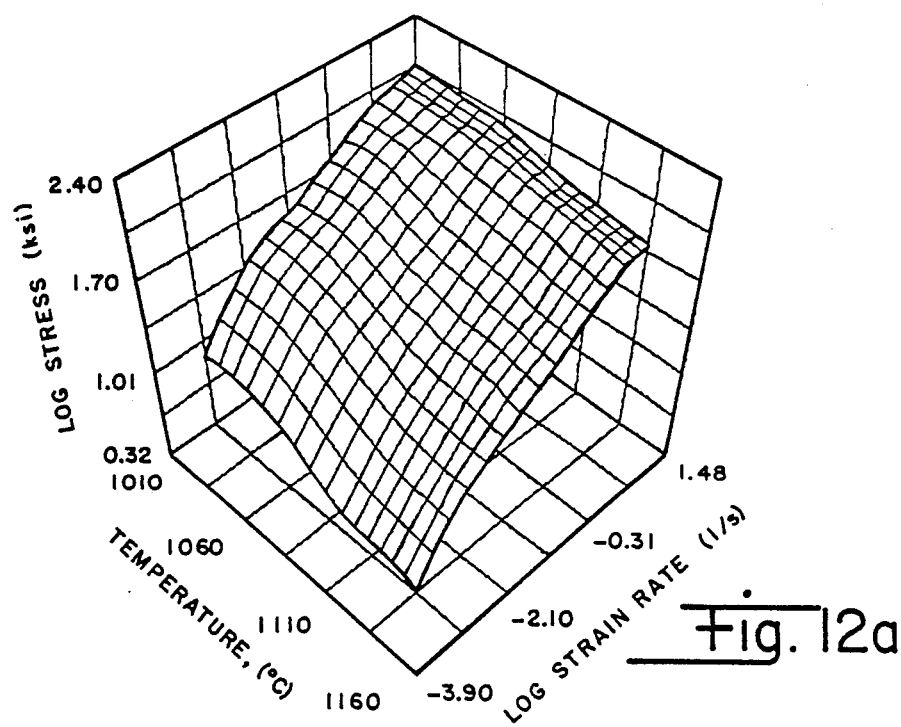
FIG. 12a is a three-dimensional plot of stress, temperature and strain rate for Rene-95 Ni based P/M alloy.
Figure 12B:
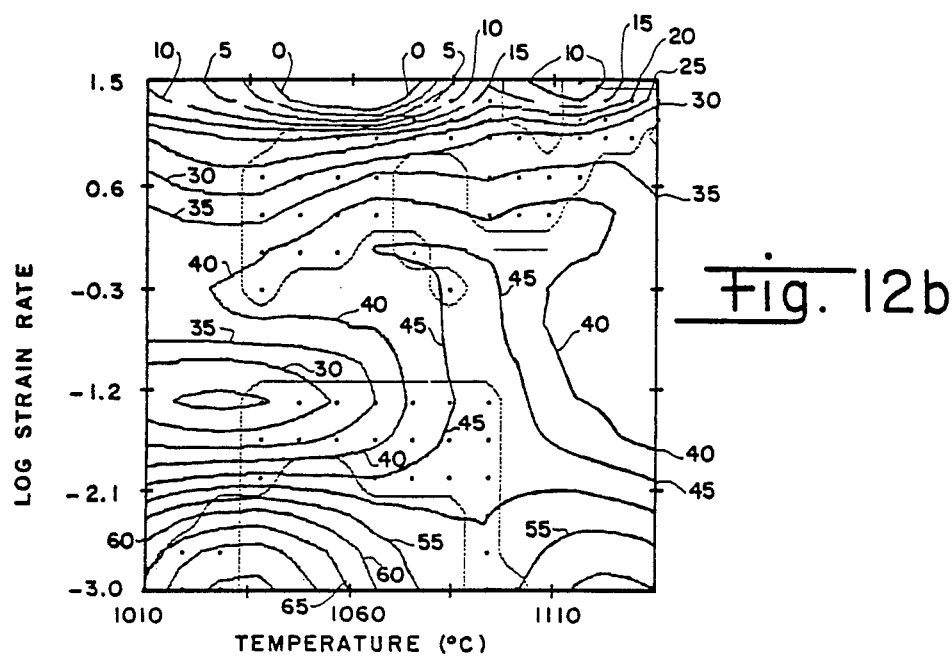
Figure 12C:
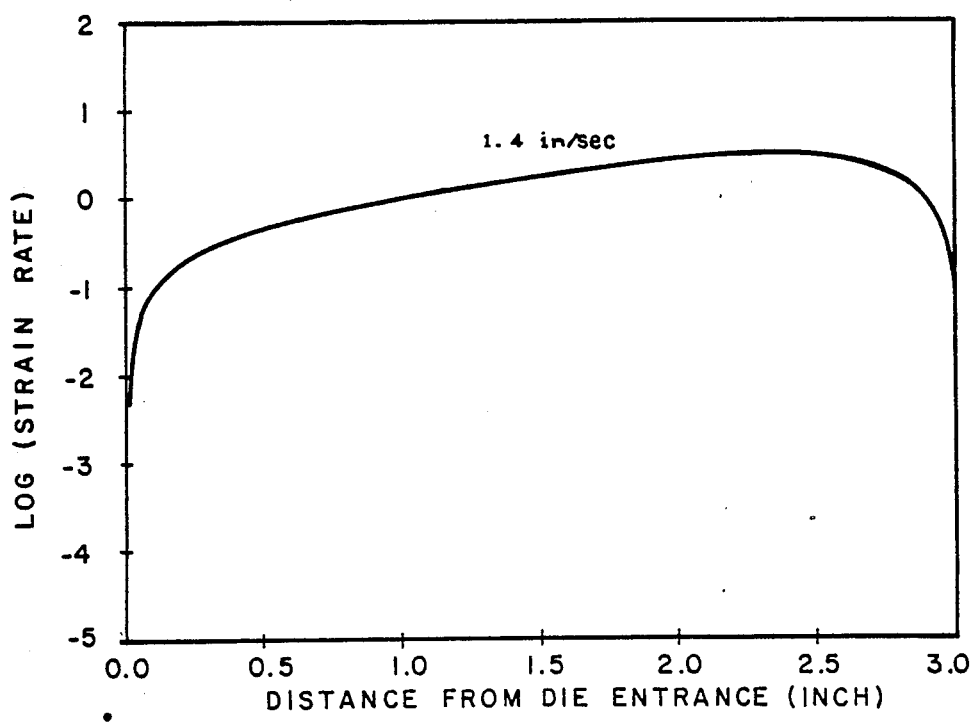
FIG. 12c is a plot of strain rate versus distance along the die length from die entrance for extrusion of material of FIGS. 12a, 12b.

The compacted cans were cleaned and lubricated with Polygraph. Two extrusions were performed, one using a 3.00 inch long streamlined die at a 4.3:1 extrusion ratio and another using a streamlined die with a 6.55:1 extrusion ratio. The dies were coated with $ZrO_2$ and lubricated using Polygraph and graphite. Fiske 604 was used as lubricant for the container. Both the extrusions were performed at 1850° F. with a ram speed of 1 inch per second. In both cases, extruded products were found to be defect free. FIG. 12a shows a three dimensional plot of stress, temperature and strain rate for the material, and FIG. 12b shows a map of constant efficiency contours derived from the constitutive data shown in FIG. 12a, for the alloy material. The temperature and strain rate conditions used for successful extrusions correspond to the stable (shaded) regions shown in the map of FIG. 12b. The strain rate variation along the die length for the 4.3:1 extrusion is shown in FIG. 12c. The initial billet diameter was 2.9 inches and the product diameter was 1.4 inches. At the beginning of the extrusion, the strain rate as shown in FIG. 12c was about $10^{-3}$ $s^{-1}$. However, when the material reaches about 2.5/3 of the die length, the strain rate has increased to a maximum at about 0.66 $s^{-1}$; the strain increases as a function of length. Due to the increase in strain rate and effective strain, there is during the extrusion a concurrent temperature rise of about 75° F. As a result, the material takes a temperature and strain rate path such that it reaches the stable region observed in the high strain rate regime of the processing map of FIG. 12b. In addition, the streamlined die maintains the $\sigma_m/\sigma$ ratio less than zero which is a favorable condition for a successful extrusion. Thus it provides a sufficient condition for good workability. This illustrates the combined effect of die design and intrinsic behavior on the overall workability of the material. This principle is applicable to other deformation processes as would occur to one with skill in the field of the invention, such as forging, ring rolling, shape rolling and sheet metal working.

Figure 13A:
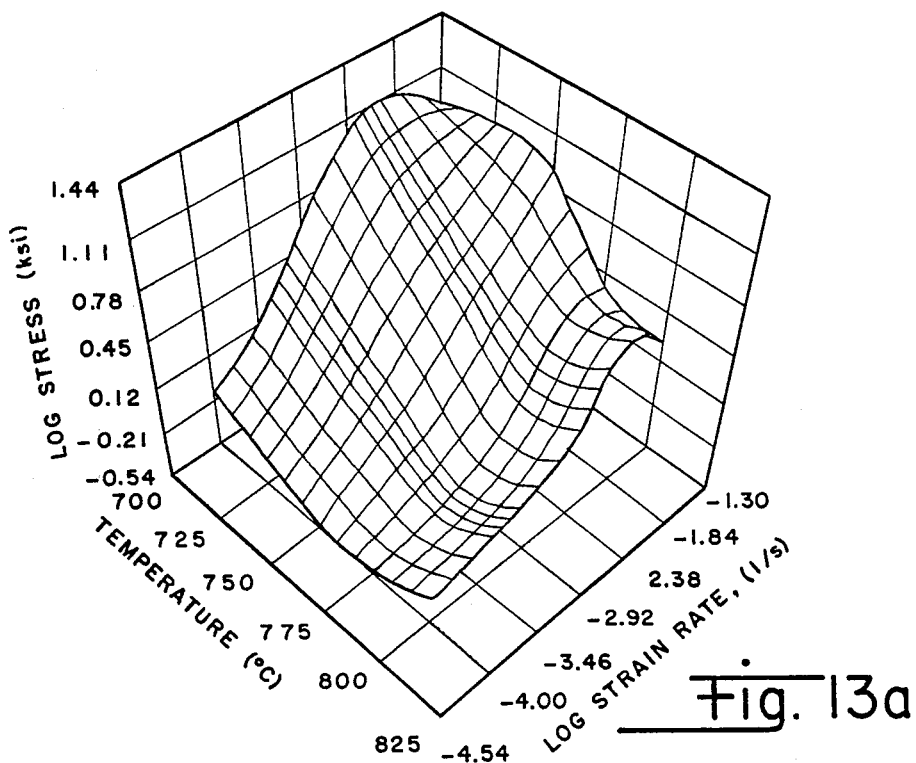
FIG. 13a is a three-dimensional plot of stress, temperature and strain rate for 7740 glass—20 v/o SiC whisker composite.
Figure 13B:
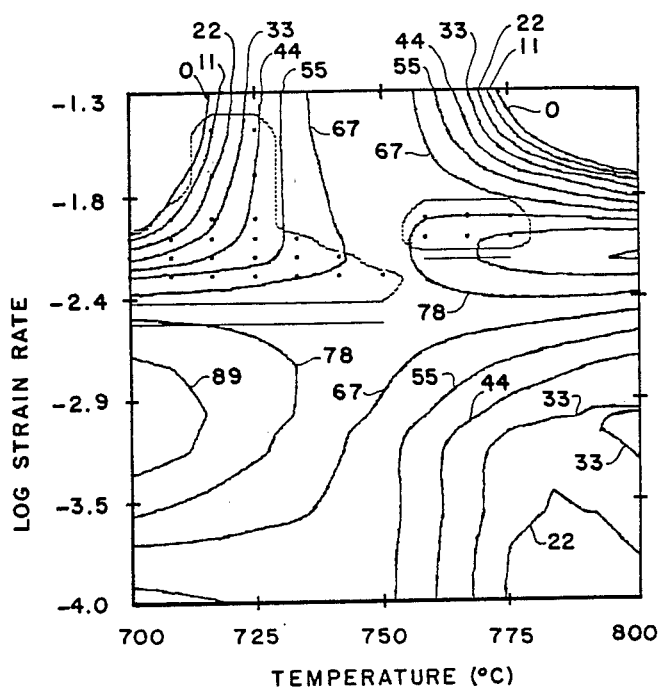

7740 Glass—20 v/o SiC Whisker Composite: A glass-ceramic composite was fabricated by ultrasonically mixing Pyrex TM 7740 glass frit with 20 v/o Tokai SiC whisker in a methanol slip. The slip was dried and vacuum hot pressed in a one inch diameter die at 900° C. for 20 minutes at 2500 psi. Several hot pressed samples were stacked in a mild steel (precoated with BN) extrusion can. The can was evacuated, sealed at 300° C., and extruded through a streamlined die at an extrusion ratio of 6:1. FIG. 13a shows a three dimensional plot of stress, temperature and strain rate, and FIG. 13b shows a map of constant efficiency contours derived from the data of FIG. 13a, for the material. Temperature and strain rate conditions for successful extrusions according to the invention correspond to the stable (shaded) regions of FIG. 13b. The extrusion conditions for the samples herein correspond to the stable region of FIG. 13b at 725° C. and a strain rate of $10^{-2}s^{-1}$. The successful extrusion was slow cooled to room temperature overnight and the composite was removed by grinding and acid etch of the mild steel can.

The invention therefore provides a process for hot forming materials, and may have particular application to RST P/M alloys. It is understood that certain modifications to the invention may be made, as might occur to one with skill in the field of the invention, within the scope of the appended claims. All embodiments contemplated hereunder which achieve the objects of the invention have therefore not been shown in complete detail. Other embodiments may be developed without departing from the spirit of the invention or from the scope of the appended claims.

We claim:

1. A process for manufacturing a preform of a material comprising the steps of:
   (a) heating a preselected quantity of a powder of the material at a first preselected temperature under vacuum to degas said powder;
   (b) compacting said powder at a second preselected temperature and at preselected pressure to provide a compact of said powder;
   (c) generating flow stress data as a function of strain rate and temperature on samples of said material at preselected strain within preselected ranges of temperature and strain rate;
   (d) determining from said data the power dissipation efficiency as a function of temperature and strain rate for said material within said ranges of temperature and strain rate;
   (e) selecting from said data values of strain rate and corresponding extrusion temperature at which dynamic recrystallization is the dominant metallurgical mechanism characterizing said material; and
   (f) extruding said compact at said extrusion temperature and at an extrusion rate corresponding to said selected strain rate to a preselected size for said preform.

2. The process of claim 1 further comprising the step of providing a streamlined die of preselected extrusion ratio and wherein said step of extruding said compact is performed through said streamlined die.

3. The process of claim 2 further comprising the steps of providing an extrusion can for said compact and inserting said compact into said can and wherein said extruding step is characterized by extruding said compact and can at said extrusion temperature and extrusion rate.

4. The process of claim 3 further comprising the step of heat soaking said compact and can at said extrusion temperature for preselected time.

5. The process of claim 1 wherein said material is a metal.

6. The process of claim 1 wherein said material is a powder metallurgy alloy.

7. The process of claim 1 wherein step (a) thereof is characterized by heating said powder at said first temperature in the range of from about 400° C. to about 460° C. under a vacuum of less than about $10^{-4}$ torr.

8. The process of claim 1 wherein said second preselected temperature is about 0.75 times the melting point temperature of said material in °K.

9. The process of claim 1 wherein said compacting said powder is performed at greater than about 181 ksi.

10. A process for manufacturing a preform of a material comprising the steps of:
    (a) cold compacting a preselected quantity of a powder of the material to about 75% density of said material to provide a compact of said powder;
    (b) heating said compact at a first preselected temperature under vacuum to degas said compact;
    (c) vacuum hot pressing said compact at a second preselected temperature and at preselected pressure;
    (d) generating flow stress data as a function of strain rate and temperature on samples of said material at preselected strain within preselected ranges of temperature and strain rate;
    (e) determining from said data the power dissipation efficiency as a function of temperature and strain rate for said material within said ranges of temperature and strain rate;
    (f) selecting from said data values of strain rate and corresponding extrusion temperature at which dynamic recrystallization is the dominant metallurgical mechanism characterizing said material; and
    (g) extruding said compact at said extrusion temperature and at an extrusion rate corresponding to said selected strain rate to a preselected size for said preform.

11. The process of claim 10 further comprising the step of providing a streamlined die of preselected extrusion ratio and wherein said step of extruding said compact is performed through said streamlined die.

12. The process of claim 11 further comprising the steps of providing an extrusion can for said compact and inserting said compact into said can after said vacuum hot pressing step and wherein said extruding step is characterized by extruding said compact and can at said extrusion temperature and extrusion rate.

13. The process of claim 12 further comprising the step of heat soaking said compact and can at said extrusion temperature for preselected time.

14. The process of claim 10 wherein said material is a metal.

15. The process of claim 10 wherein said material is a powder metallurgy alloy.

16. The process of claim 10 wherein step (b) thereof is characterized by heating said powder at said first temperature in the range of from about 400° C. to about 460° C. under a vacuum of less than about $10^{-4}$ torr.

17. The process of claim 10 wherein said second preselected temperature is about 0.75 times the melting point temperature of said material in °K.

18. The process of claim 10 wherein said compacting said powder is performed at greater than about 181 ksi.

19. A process for manufacturing a preform of a material comprising the steps of:
 (a) heating a preselected quantity of a powder of the material in an extrusion can at a first preselected temperature under vacuum to degas said powder;
 (b) compacting said powder within said can at a second preselected temperature and at preselected pressure to provide a canned compact of said powder;
 (c) generating flow stress data as a function of strain rate and temperature on samples of said material at preselected strain within preselected ranges of temperature and strain rate;
 (d) determining from said data the power dissipation efficiency as a function of temperature and strain rate for said material within said ranges of temperature and strain rate;
 (e) selecting from said data values of strain rate and corresponding extrusion temperature at which dynamic recrystallization is the dominant metallurgical mechanism characterizing said material; and
 (f) extruding said canned compact at said extrusion temperature and at an extrusion rate corresponding to said selected strain rate to a preselected size for said preform.

20. The process of claim 19 further comprising the step of providing a streamlined die of preselected extrusion ratio and wherein said step of extruding said canned compact is performed through said streamlined die.

21. The process of claim 20 further comprising the step of heat soaking said compact and can at said extrusion temperature for preselected time.

22. The process of claim 19 wherein said material is a metal.

23. The process of claim 19 wherein said material is a powder metallurgy alloy.

24. The process of claim 19 wherein step (a) thereof is characterized by heating said powder at said first temperature in the range of from about 400° C. to about 460° C. under a vacuum of less than about $10^{-4}$ torr.

25. The process of claim 19 wherein said second preselected temperature is about 0.75 times the melting point temperature of said material in °K.

26. A process for manufacturing a preform of a material comprising the steps of: '(a) cold compacting a preselected quantity of a powder of the material to about 75% density of said material to provide a compact of said powder;
 (b) heating said compact at a first preselected temperature under vacuum to degas said compact;
 (c) vacuum hot pressing said compact at a second preselected temperature and at preselected pressure;
 (d) generating flow stress data as a function of strain rate and temperature on samples of said material at preselected strain within preselected ranges of temperature and strain rate;
 (e) determining from said data the power dissipation efficiency as a function of temperature and strain rate for said material within said ranges of temperature and strain rate;
 (f) selecting from said data values of strain rate and corresponding extrusion temperature at which dynamic recrystallization is the dominant metallurgical mechanism characterizing said material;
 (g) inserting said compact into an extrusion can; and
 (h) extruding said compact and extrusion can at said extrusion temperature and at an extrusion rate corresponding to said selected strain rate to a preselected size for said preform.

27. The process of claim 26 further comprising the step of providing a streamlined die of preselected extrusion ratio and wherein said step of extruding said compact and can is performed through said streamlined die.

28. The process of claim 27 further comprising the step of heat soaking said compact and can at said extrusion temperature for preselected time.

29. The process of claim 26 wherein said material is a metal.

30. The process of claim 26 wherein said material is a powder metallurgy alloy.

31. The process of claim 26 wherein step (b) thereof is characterized by heating said powder at said first temperature in the range of from about 400° C. to about 460° C. under a vacuum of less than about $10^{-4}$ torr.

32. The process of claim 26 wherein said second preselected temperature is about 0.75 times the melting point temperature of said material in °K.

33. A method for generating a processing map for displaying process parameters for hot forming a material and from which optimum processing parameters for performing said hot forming are preselected, comprising the steps of:
 (a) generating flow stress data as a function of strain rate and temperature on samples of said material at preselected strain within preselected ranges of temperature and strain rate;
 (b) determining from said data the power dissipation efficiency of said material as a function of temperature and strain rate within said ranges of temperature and strain rate;
 (c) mapping values of said power dissipation efficiency versus corresponding values of temperature and strain rate from said generated data on a plot displaying constant power dissipation efficiency contours; and
 (d) defining from said data those regions of said plot wherein the change in power dissipation efficiency with the logarithm of strain rate is less than or equal to zero.

34. The method of claim 33 further comprising the step of further defining from said data those portions of said regions of said plot wherein the change in entropy production rate of said material with the logarithm of strain rate is less than or equal to zero.

35. The method of claim 33 wherein said material is a metal.

36. The method of claim 33 wherein said material is a powder metallurgy alloy.

* * * * *

UNITED STATES PATENT AND TRADEMARK OFFICE
CERTIFICATE OF CORRECTION

PATENT NO. : 4,762,679

DATED : August 9, 1988

INVENTOR(S) : Harold L. Gegel et al

Page 1 of 2

It is certified that error appears in the above-identified patent and that said Letters Patent is hereby corrected as shown below:

In the ABSTRACT:

line 15, "powder" should be ---power---.

line 20, the colon (:) should be a semicolon (;).

Column 2, line 63, the colon (:) should be a semicolon (;).

Column 6, in Eq (1), "$\bar{\sigma}\bar{\epsilon}$" should be ---$\bar{\sigma}\,\bar{\dot{\epsilon}}$---.

Column 6, line 19, "$\epsilon$" should be ---$\dot{\epsilon}$---.

Column 6, in Eq (2), "$\sigma d\epsilon$" should be ---$\sigma d\dot{\epsilon}$---.

Column 6, Eq (3) should read ---P = G + J---.

Column 6, in Eq (4), "$\dot{\epsilon}$" should be ---$\epsilon$---.

Column 7, in Eq (8), "$\dot{\sigma}\epsilon$" should be ---$\sigma\dot{\epsilon}$---.

Column 7, in Eq (9), "$\dot{\sigma}\epsilon$" should be ---$\sigma\dot{\epsilon}$---.

Column 7, line 53, following Eq (11), "$\epsilon$" should be ---$\dot{\epsilon}$---.

Column 7, in Eq (12), "$\dot{\sigma}\epsilon$" should be ---$\sigma\dot{\epsilon}$---.

Column 8, line 36, following Eq (16), "$\epsilon$" should be ---$\dot{\epsilon}$---, two occurrences.

Column 8, line 59, "$\epsilon$" should be ---$\dot{\epsilon}$---.

Column 9, line 13, "$\epsilon$" should be ---$\dot{\epsilon}$---.

Column 9, line 26, "$\epsilon$" should be ---$\dot{\epsilon}$---, two occurrences.

UNITED STATES PATENT AND TRADEMARK OFFICE
CERTIFICATE OF CORRECTION

PATENT NO. : 4,762,679

DATED : August 9, 1988

INVENTOR(S) : Harold L. Gegel et al

Page 2 of 2

It is certified that error appears in the above-identified patent and that said Letters Patent is hereby corrected as shown below:

Column 9, line 33, "$\varepsilon$" should be ---$\dot{\varepsilon}$---.

Column 9, line 36, "$\varepsilon$" should be ---$\dot{\varepsilon}$---.

Column 9, line 38, "$\varepsilon$" should be ---$\dot{\varepsilon}$---.

Column 9, line 54, "$\varepsilon$" should be ---$\dot{\varepsilon}$---.

Column 9, line 60, "$\varepsilon$" should be ---$\dot{\varepsilon}$---.

Column 13, line 14, "Pyrex TM" should be ---Pyrex$^{TM}$.

Column 16, line 2, in claim 26, "data" should be ---rate---.

Signed and Sealed this

Twenty-eighth Day of February, 1989

Attest:

DONALD J. QUIGG

Attesting Officer

Commissioner of Patents and Trademarks